May 14, 1940.  L. A. KILGORE  2,201,006
VARIABLE SPEED MOTOR DRIVE
Filed Oct. 18, 1938   2 Sheets-Sheet 1

WITNESSES:
C. J. Weller.
Thos. C. Groome

INVENTOR
Lee A. Kilgore.
BY
S. A. Strickland
ATTORNEY

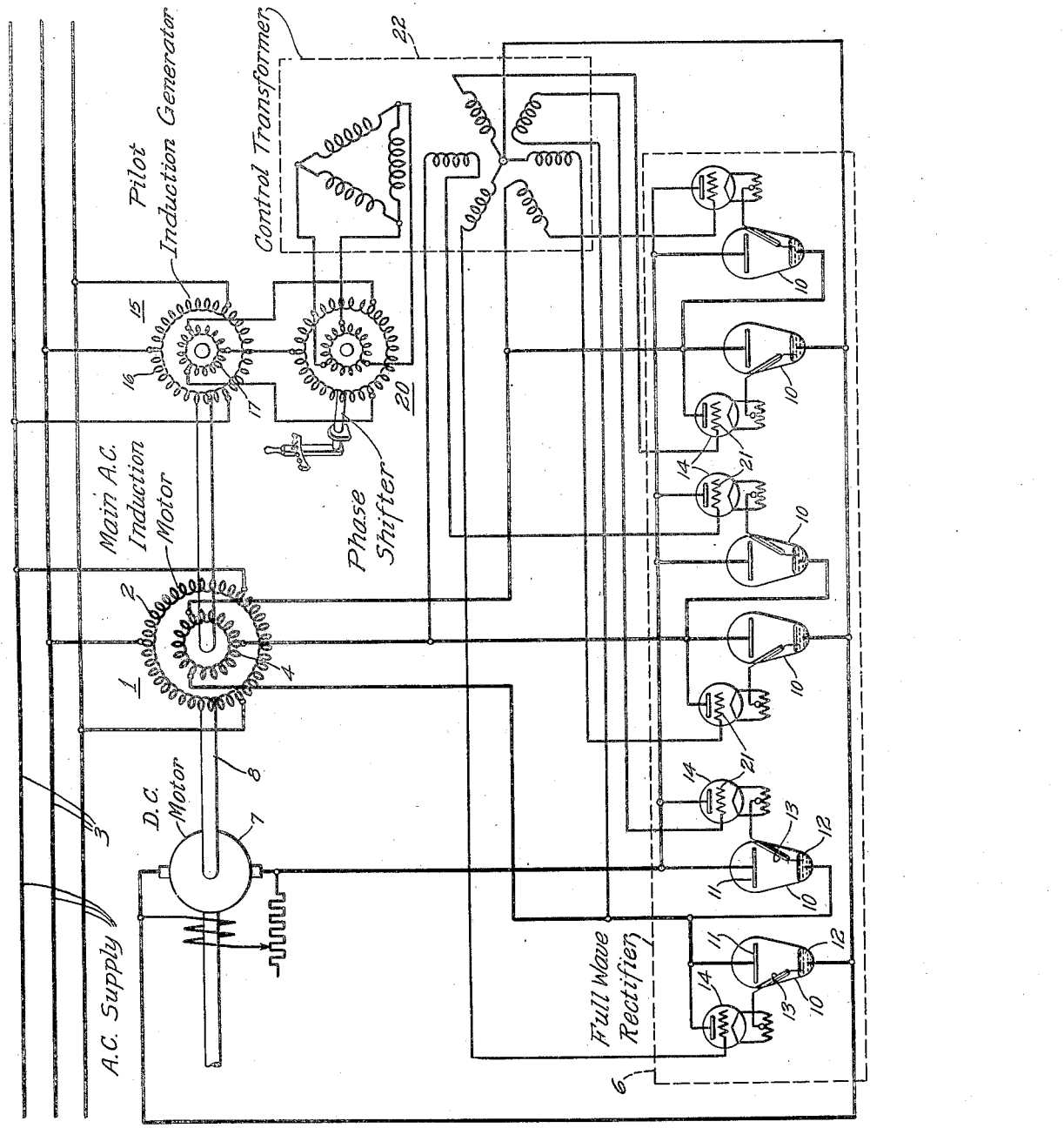

Patented May 14, 1940

2,201,006

UNITED STATES PATENT OFFICE 2,201,006

VARIABLE SPEED MOTOR DRIVE

Lee A. Kilgore, Forest Hills, Pa., assignor to Westinghouse Electric & Manufacturing Company, East Pittsburgh, Pa., a corporation of Pennsylvania Application October 18, 1938, Serial No. 235,583

6 Claims. (Cl. 172—274)

My invention relates to a variable speed motor drive, and particularly to a control system for assuring constant control of a rectifier controlling the output of the secondary of a wound rotor induction motor.

It has heretofore been proposed to construct a variable speed motor drive by employing a wound rotor induction motor as the main driving element and to control the output of the wound rotor by means of a controlled rectifier; preferably feeding the rectified current to an auxiliary direct current motor mechanically coupled to the main driving motor. Because of the commutation of the rectifier device, the output voltage of the wound rotor secondary is very irregular sometimes falling to substantially zero, so that if the secondary potential is utilized to control the rectifier device, there is considerable danger of false operation of the control device and consequent loss of control in the rectifier device resulting in undesirable speed variations in the motor drive.

It is an object of my invention to provide such a motor drive in which the control potential for the converter is provided which has a suitable, preferably smooth sine wave form, so that the control of the converter will not be lost because of variations or irregularities in the secondary output of the wound rotor driving motor. For securing this smooth control potential I prefer to employ an auxiliary wound rotor pilot generator directly coupled to the driving shaft of the main motor so that the auxiliary pilot generator has a frequency corresponding to the slip frequency of the main driving motor.

Other objects and advantages of my invention will be apparent from the detailed description taken in conjunction with the accompanying drawings, in which:

Fig. 2 is a schematic diagram of the connections according to my invention, and

Figure 1:
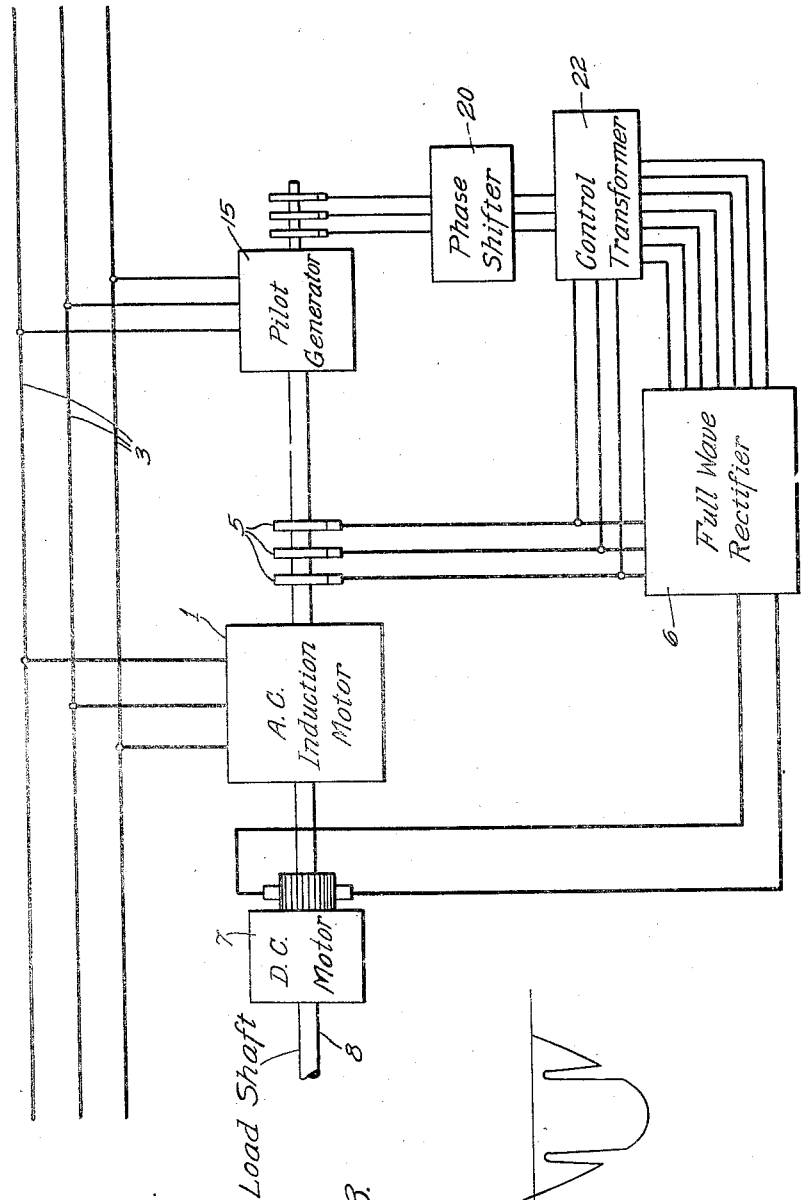
Figure 1 is a diagrammatic layout of a motor drive according to my invention.

The motor drive according to my invention comprises a wound rotor induction motor 1 having a primary winding 2 connected to a suitable source of alternating current 3 and a secondary winding 4 connected by means of suitable slip rings 5 to a full wave rectifier 6, preferably of the make-alive type. The rectified output of the secondary winding 4 of the induction motor 1 is supplied to a suitable direct current motor 7, preferably directly connected to the drive shaft 8 of the main induction motor 1 but obviously the direct current motor 7 may be utilized either to drive a separate load or to drive a suitable generator for feeding back the secondary current to the main alternating current supply circuit 3.

The full wave rectifier 6 preferably comprises a plurality of make-alive type valves 10, individual valves 10 being enclosed in individual containers each of which includes a main anode 11, cathode 12 and a suitable make-alive electrode 13. Preferably the make-alive electrodes 13 are supplied with make-alive current by means of a suitable connection to the corresponding anodes 11, the flow of current being controlled by auxiliary grid controlled valves 14 herein illustrated as of the hot cathode type.

In order to secure a control potential having a frequency corresponding to the slip frequency of the main motor 1, I provide a pilot induction generator 15 similar to a wound rotor induction motor coupled directly to the main induction motor 1. The primary 16 of this pilot generator is supplied with energy preferably from the main alternating current source 3 so that the output frequency of the secondary winding is identical with the output frequency or slip frequency of the secondary 4 of the main induction motor 1.

In order to provide speed control for the main induction motor 1, a suitable phase shifter 20 herein indicated as an induction phase shifter is connected in series with pilot generator 15. The phase shifter 20 is preferably located between the pilot generator 15 and the control transformer 22 as in this position the minimum size device can be utilized as only the actual control energy is handled. However, it may at times be desirable to shift the phase relation of the primary instead of the secondary or output potential in which case the phase shifter 20 will be inserted between the alternating current supply 3 and the pilot generator 15. The control grids 21 of the auxiliary valves 14 are then supplied with control potential through a suitable control transformer 22 by the phase controlled output potential of the pilot generator 15.

In the operation of the motor drive according to my invention, the speed of the main induction motor 1 is controlled by shifting the phase relation of the output potential of the pilot generator 15 so that the current drawn from the secondary 4 of the main driving motor 1 is controlled. The rectified secondary current is preferably fed to a suitable direct current motor 7 so that the system has a constant horsepower output.

Figure 3:
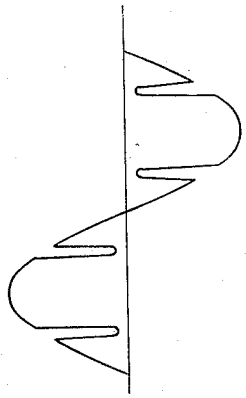
Fig. 3 is a diagrammatic representation of the secondary potential of the wound rotor induction motor.

Because of the control of the rectifier 6 the potential of the secondary 4 has a fluctuating potential as shown in Fig. 3 in which a single phase of the output potential is diagrammatically illustrated. When the rectifier 6 is operating with considerable angle of delay, the phase potential of the secondary 4 builds up along the normal wave form then at the instant of firing of the valve 10 of the converter 6 the phase potentials commutate at which time there is an essential short circuit between phase producing a dip in the phase voltage which, at maximum delay, may approach zero, however, as the control potential for the rectifier 6 is produced by an independent pilot generator the control of the valves is in no wise affected by the fluctuations of the secondary voltage of the main motor 1.

For purpose of illustration I have shown and described a specific embodiment of my invention. It will be apparent that changes and modifications can be made therein without departing from the true spirit of my invention or the scope of the appended claims.

I claim as my invention:

1. A variable speed motor drive comprising a wound rotor induction motor having a primary and a secondary winding, means for supplying substantially constant frequency alternating current to said primary winding, a direct current motor, connections including a controlled rectifier for supplying current to said direct current motor from the secondary winding of said induction motor; a pilot generator coupled to said induction motor, a primary and secondary winding in said pilot generator, said primary winding of said pilot generator being connected to the source of alternating current supply of said induction motor, control electrodes in said rectifier, means for supplying control potential to said control electrodes and connections for applying the potential of the secondary winding of said pilot generator for controlling the application of control potential to said control electrodes.

2. A variable speed motor drive comprising a wound rotor induction motor including a primary and a secondary winding, a source of polyphase alternating current connected to the primary winding of said induction motor, a direct current motor, feeding connections for feeding said direct current motor from said secondary winding, a polyphase full wave, make-alive type valve converter interposed in said feeding connections, a pilot generator coupled with said wound rotor induction motor, said pilot generator having an output frequency equal to the slip frequency of the wound rotor induction motor, make-alive electrodes for initiating current flow in said converter, make-alive connections including grid controlled auxiliary valves, means including control transformer means for impressing the pilot generator potential on the grids of said auxiliary valves for controlling the operation of said make-alive type converter.

3. A variable speed motor drive comprising a wound rotor induction motor including a primary and a secondary winding, a source of polyphase alternating current connected to the primary winding of said induction motor, a direct current motor, feeding connections for feeding said direct current motor from said secondary winding, a polyphase full wave, make-alive type valve converter interposed in said feeding connections, a pilot generator coupled with said wound rotor induction motor, said pilot generator having an output frequency equal to the slip frequency of the wound rotor induction motor, make-alive electrodes for initiating current flow in said make-alive connections including grid controlled auxiliary valves, means including control transformer means for impressing the pilot generator potential on the grid of said auxiliary valves for controlling the operation of said make-alive type valves and phase shifter means interposed between said pilot generator and said control transformer means.

4. A variable speed motor drive comprising a wound rotor induction motor, a direct current motor, connections for supplying current from said wound rotor induction motor to said current motor, a controlled multi-valve rectifier in said connections, a pilot generator coupled to said wound rotor motor, said pilot generator having a frequency corresponding to the slip frequency of the wound rotor induction motor, control electrodes associated with the valves of said multi-valve rectifier, control connections for supplying control potential to said control electrodes, auxiliary grid controlled valves in said control connections and connecting means for impressing the potential of said pilot generator on the grids of said auxiliary valves for controlling the application of control potential to said control electrodes.

5. A variable speed motor drive comprising a wound rotor induction motor, a direct current motor, connections for supplying current from said wound rotor induction motor to said direct current motor, a controlled multi-valve rectifier in said connections, a pilot generator coupled to said wound rotor motor, said pilot generator having a frequency corresponding to the slip frequency of the wound rotor induction motor, control electrodes associated with the valves of said multi-valve rectifier, control connections for supplying control potential to said control electrodes, auxiliary grid controlled valves in said control connections and connecting means for impressing the potential of said pilot generator on the grids of said auxiliary valves for controlling the application of control potential to said control electrodes and phase shifter means connected in series with the output potential of said pilot generator.

6. A variable speed motor drive comprising a main wound rotor induction motor, a full wave rectifier for controlling the current drawn by said main induction motor, a direct current motor supplied with current from said main induction motor through said full wave rectifier, a pilot induction generator coupled to said main induction motor for providing a control potential of the same frequency as the secondary potential of said main induction motor, control electrodes associated with said full wave rectifier and connection for impressing the potential of said pilot generator to control the operation of said control electrodes.

LEE A. KILGORE.